(12) United States Patent
Triplicane et al.

(10) Patent No.: US 8,264,521 B2
(45) Date of Patent: Sep. 11, 2012

(54) MEDIA DETECTION AND PACKET DISTRIBUTION IN A MULTIPOINT CONFERENCE

(75) Inventors: Vijayaraghavan R. Triplicane, Union City, CA (US); Murthy V. Atmakuri, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1522 days.

(21) Appl. No.: 11/799,019

(22) Filed: Apr. 30, 2007

(65) Prior Publication Data
US 2008/0266384 A1 Oct. 30, 2008

(51) Int. Cl.
*H04N 7/14* (2006.01)

(52) U.S. Cl. ........... 348/14.1; 348/14.11; 348/14.16; 379/202.01; 709/201; 709/205; 709/220; 709/228; 709/232

(58) Field of Classification Search .... 348/14.01–14.16; 370/259–271, 351–356; 709/217–248, 201–207
See application file for complete search history.

(56) References Cited

U.S. PATENT DOCUMENTS

| | | | | |
|---|---|---|---|---|
| 5,007,046 | A | 4/1991 | Erving et al. | 370/32.1 |
| 5,058,153 | A | 10/1991 | Carew et al. | 379/390 |
| 5,436,896 | A * | 7/1995 | Anderson et al. | 370/260 |
| 5,473,363 | A * | 12/1995 | Ng et al. | 348/14.09 |
| 5,481,720 | A | 1/1996 | Loucks et al. | 726/21 |
| 5,560,008 | A | 9/1996 | Johnson et al. | 726/5 |
| 5,764,887 | A | 6/1998 | Kells et al. | 726/14 |
| 5,768,379 | A | 6/1998 | Girault et al. | 713/185 |
| 5,787,170 | A | 7/1998 | Op de Beek | 713/165 |
| 5,815,574 | A | 9/1998 | Fortinsky | 713/153 |
| 5,822,433 | A | 10/1998 | Bottle et al. | 713/155 |
| 5,844,600 | A * | 12/1998 | Kerr | 348/14.12 |
| 5,848,098 | A | 12/1998 | Cheng et al. | 375/220 |
| 5,854,894 | A | 12/1998 | Lancaster et al. | 709/219 |
| 5,864,665 | A | 1/1999 | Tran | 726/10 |

(Continued)

FOREIGN PATENT DOCUMENTS

EP 1 720 283 A2 1/2004

(Continued)

OTHER PUBLICATIONS

The Second Office Action, The Patent Office of the People's Republic of China, Application No. 200480026120.3, 7 pages (only first 2 pages translated), Dec. 11, 2009.

(Continued)

*Primary Examiner* — Hemant Patel
(74) *Attorney, Agent, or Firm* — Baker Botts L.L.P.

(57) ABSTRACT

A method for distributing media packets in a multipoint conference includes receiving a plurality of audio signals. Each of the plurality of audio signals includes audio packets, wherein one or more audio packets from each of the plurality of audio signals is coded with an audiometric, the audiometric including an acoustic measurement from a conference site. The method further includes, for each of the plurality of audio signals, extracting an audiometric from one or more audio packets and selecting an active audio signal based on the extracted audiometrics. In addition, the method includes determining a change in the active audio signal and in response to determining a change in the active audio signal, updating a media forwarding table, the media forwarding table including a directory for routing one or more of the plurality of audio signals. The method further includes distributing audio packets to one or more conference sites in accordance with the media forwarding table.

30 Claims, 2 Drawing Sheets

U.S. PATENT DOCUMENTS

| | | | | |
|---|---|---|---|---|
| 5,920,562 | A | 7/1999 | Christie et al. | 370/395.5 |
| 5,928,323 | A | 7/1999 | Gosling et al. | 709/203 |
| 5,974,566 | A | 10/1999 | Ault et al. | 714/15 |
| 5,983,273 | A | 11/1999 | White et al. | 709/229 |
| 6,078,809 | A | 6/2000 | Proctor | 455/416 |
| 6,088,430 | A | 7/2000 | Mc Hale | 379/93.38 |
| 6,122,631 | A | 9/2000 | Berbec et al. | 707/9 |
| 6,128,649 | A | 10/2000 | Smith et al. | 709/217 |
| 6,148,068 | A | 11/2000 | Lowery et al. | 379/202 |
| 6,300,973 | B1 | 10/2001 | Feder et al. | 348/14.09 |
| 6,327,276 | B1* | 12/2001 | Robert et al. | 370/535 |
| 6,332,153 | B1 | 12/2001 | Cohen | 709/204 |
| 6,393,481 | B1 | 5/2002 | Deo et al. | 709/224 |
| 6,401,211 | B1 | 6/2002 | Brezak, Jr. et al. | 726/5 |
| 6,418,125 | B1* | 7/2002 | Oran | 370/266 |
| 6,453,362 | B1 | 9/2002 | Bittinger et al. | 719/316 |
| 6,477,708 | B1 | 11/2002 | Sawa | 725/116 |
| 6,501,739 | B1* | 12/2002 | Cohen | 370/260 |
| 6,535,604 | B1 | 3/2003 | Provencal et al. | 379/388.06 |
| 6,567,916 | B1 | 5/2003 | Terao et al. | 713/176 |
| 6,590,604 | B1 | 7/2003 | Tucker et al. | 348/14.13 |
| 6,662,211 | B1* | 12/2003 | Weller | 709/204 |
| 6,678,733 | B1 | 1/2004 | Brown et al. | 709/229 |
| 6,697,342 | B1* | 2/2004 | Smyth et al. | 370/260 |
| 6,760,759 | B1 | 7/2004 | Chan | 709/219 |
| 6,819,652 | B1 | 11/2004 | Akhtar et al. | 370/230 |
| 6,981,047 | B2 | 12/2005 | Hanson et al. | 709/227 |
| 6,986,157 | B1 | 1/2006 | Fijolek et al. | 725/111 |
| 6,989,856 | B2* | 1/2006 | Firestone et al. | 348/14.09 |
| 7,006,616 | B1* | 2/2006 | Christofferson et al. | 379/202.01 |
| 7,007,098 | B1* | 2/2006 | Smyth et al. | 709/233 |
| 7,039,027 | B2 | 5/2006 | Bridgelall | 370/329 |
| 7,054,268 | B1 | 5/2006 | Paranteinen et al. | 370/231 |
| 7,079,499 | B1 | 7/2006 | Akhtar et al. | 370/310 |
| 7,145,898 | B1 | 12/2006 | Elliott | 370/352 |
| 7,151,758 | B2 | 12/2006 | Kumaki et al. | 370/331 |
| 7,266,091 | B2* | 9/2007 | Singh et al. | 370/260 |
| 7,454,460 | B2* | 11/2008 | Ivashin | 709/203 |
| 7,477,282 | B2 | 1/2009 | Firestone et al. | 348/14.09 |
| 7,848,265 | B2* | 12/2010 | Levy et al. | 370/260 |
| 2002/0044534 | A1* | 4/2002 | Cohen | 370/263 |
| 2002/0126626 | A1* | 9/2002 | Singh et al. | 370/260 |
| 2003/0174657 | A1* | 9/2003 | Qin | 370/260 |
| 2004/0008635 | A1* | 1/2004 | Nelson et al. | 370/260 |
| 2005/0078170 | A1 | 4/2005 | Firestone et al. | 348/14.08 |
| 2005/0099492 | A1* | 5/2005 | Orr | 348/14.08 |
| 2005/0237377 | A1* | 10/2005 | Chapweske et al. | 348/14.08 |
| 2006/0106703 | A1 | 5/2006 | Del Rey et al. | 705/35 |
| 2006/0221869 | A1* | 10/2006 | Chua | 370/260 |
| 2006/0251038 | A1 | 11/2006 | Tamura et al. | 370/342 |
| 2006/0264207 | A1 | 11/2006 | Tamura et al. | 455/415 |
| 2007/0078933 | A1* | 4/2007 | Ludwig et al. | 709/204 |
| 2008/0159507 | A1* | 7/2008 | Virolainen et al. | 379/202.01 |
| 2008/0218586 | A1* | 9/2008 | Graham et al. | 348/14.09 |

FOREIGN PATENT DOCUMENTS

| | | |
|---|---|---|
| JP | 2004538724 T | 8/1995 |
| WO | WO 03/065720 | 8/2003 |

OTHER PUBLICATIONS

Ylitalo, et al., *Re-thinking Security in IP based Micro-Mobility*, downloaded from www.tcs.hut.fi/Studies/T-79.5401/2005AUT/ISCO4-Vlitalo-e-al.pdf (12 pages).

Iyer, et al., "Method and System for Selective Buffering", U.S. Appl. No. 11/465,239, filed Aug. 17, 2006.

The Third Office Action from the Patent Office of the People's Republic of China in Chinese Application No. 200480026120.3 (with translation), dated May 6, 2011, 8 pages.

The First Office Action from the State Intellectual Property Office of the People's Republic of China in Chinese Application No. 200880014096.X (with translation), dated May 25, 2011 (received Jun. 28, 2011), 6 pages.

Firestone, U.S. Appl. No. 10/680,918, filed Oct. 8, 2003, Communication from the Patent Office mailed Dec. 3, 2004.

Firestone, U.S. Appl. No. 10/680,918, filed Oct. 8, 2003, Communication from the Patent Office mailed Apr. 26, 2005.

Firestone, U.S. Appl. No. 10/680,918, filed Oct. 8, 2003, Communication from the Patent Office mailed Feb. 16, 2006.

Firestone, U.S. Appl. No. 10/680,918, filed Oct. 8, 2003, Communication from the Patent Office mailed Jun. 7, 2006.

Australian Government letter to Pizzeys, Examiner's First Report on Patent Application No. 2004306740, Mar. 25, 2009.

Woo et al., Authentication for Distributed Systems, 1992, IEEE, pp. 39-51, Jan. 1992.

Neuman et al., Kerberos: An Authentication Service for Computer Network, Sep. 1994, IEEE, pp. 33-38.

Anonymous, Kerberos: A model for Single Sign-On, Mar. 2004, Business Communications Review, p. 43.

Fontana, Web Services Security Spec Approved, Apr. 26, 2004, Network World, p. 22.

European Patent Office Official Action in Application No. 04 794 355.0-1241 dated Aug. 16, 2011, 2 pages.

PCT Notification of Transmittal of the International Search Report and the Written Opinion of the International Searching Authority, or the Declaration, PCT/US2008/061711, dated Oct. 10, 2008, 9 pages.

State Intellectual Property Office of the People's Republic of China First Office Action for Application No. 200880007368.3; 12 pages, Sep. 26, 2011.

EPO Communication dated Feb. 10, 2012, with regard to Application PCT US2004032977.

PCT; International Search Report and Written Opinion; (IS/US) for PCT/US2008/55405 (8 pages), Jun. 5, 2008.

The Patent Office of the People's Republic of China, The Second Office Action dated Jun. 6, 2012 with regard to Application No. 200880014096.X, Serial 2012060100777440.

\* cited by examiner

MEDIA DETECTION AND PACKET DISTRIBUTION IN A MULTIPOINT CONFERENCE

TECHNICAL FIELD

This invention relates generally to communication systems and more particularly to media detection and packet distribution in a multipoint conference.

BACKGROUND

There are many methods available which allow groups of individuals located throughout the world to engage in conferences. Such methods generally involve transmitting information and other data from communication equipment located at one conference site to communication equipment located at one or more other locations. A multipoint control unit (MCU) (sometimes referred to as a multipoint conference unit) may be used to couple communication equipment used at the various conference sites, thereby allowing users from distributed geographic locations to participate in a teleconference.

With respect to videoconferencing, a MCU may receive and distribute multiple audio and video signals to and from multiple conference sites. In certain situations, a conference site may not have sufficient equipment to broadcast or display each of the signals generated by the remote conference sites participating in the videoconference. Accordingly, it may be necessary to switch between the audio and/or video signals broadcasted at a local conference site.

SUMMARY OF THE DISCLOSURE

The present invention provides a method and multipoint control unit for distributing media packets in a multipoint conference that substantially eliminates or greatly reduces at least some of the disadvantages and problems associated with previous methods and systems.

In accordance with a particular embodiment, a method for distributing media packets in a multipoint conference includes receiving a plurality of audio signals. Each of the plurality of audio signals includes audio packets, wherein one or more audio packets from each of the plurality of audio signals is coded with an audiometric, the audiometric including an acoustic measurement from a conference site. The method further includes, for each of the plurality of audio signals, extracting an audiometric from one or more audio packets and selecting an active audio signal based on the extracted audiometrics. In addition, the method includes determining a change in the active audio signal and in response to determining a change in the active audio signal, updating a media forwarding table, the media forwarding table including a directory for routing one or more of the plurality of audio signals. The method further includes distributing audio packets to one or more conference sites in accordance with the media forwarding table.

In certain embodiments, the method may also include receiving a plurality of video signals, wherein each of the plurality of video signals associated with one or more of the plurality of audio signals. An active video signal may be selected based on the one or more active audio signals. The method may further include distributing one or more of the video signals in accordance with the media forwarding table.

Also provided is a multipoint control unit for distributing media packets in a multipoint conference which includes an interface operable to receive a plurality of audio signals. Each of the plurality of audio signals includes audio packets, wherein one or more audio packets from each of the plurality of audio signals is coded with an audiometric, the audiometric including an acoustic measurement from a conference site. The multipoint control unit also includes a conference control processor operable to extract one or more audiometrics from one or more audio packets for each of the plurality of audio signals and select one or more active audio signals based on the one or more extracted audiometrics. The conference control processor is further operable to determine a change in the active audio signal and in response to determining a change in an active audio signal, update a media forwarding table, the media forwarding table including a directory for routing one or more of the plurality of audio signals. The conference control processor may also distribute audio packets to one or more conference sites in accordance with the media forwarding table.

Certain embodiments of the invention may provide one or more technical advantages. A technical advantage of one embodiment of the present invention is a dynamic media forwarding table which allows for the routing of signals based on changes in signal characteristics. Another technical advantage is the ability to distribute video signals based on associated audio signals.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
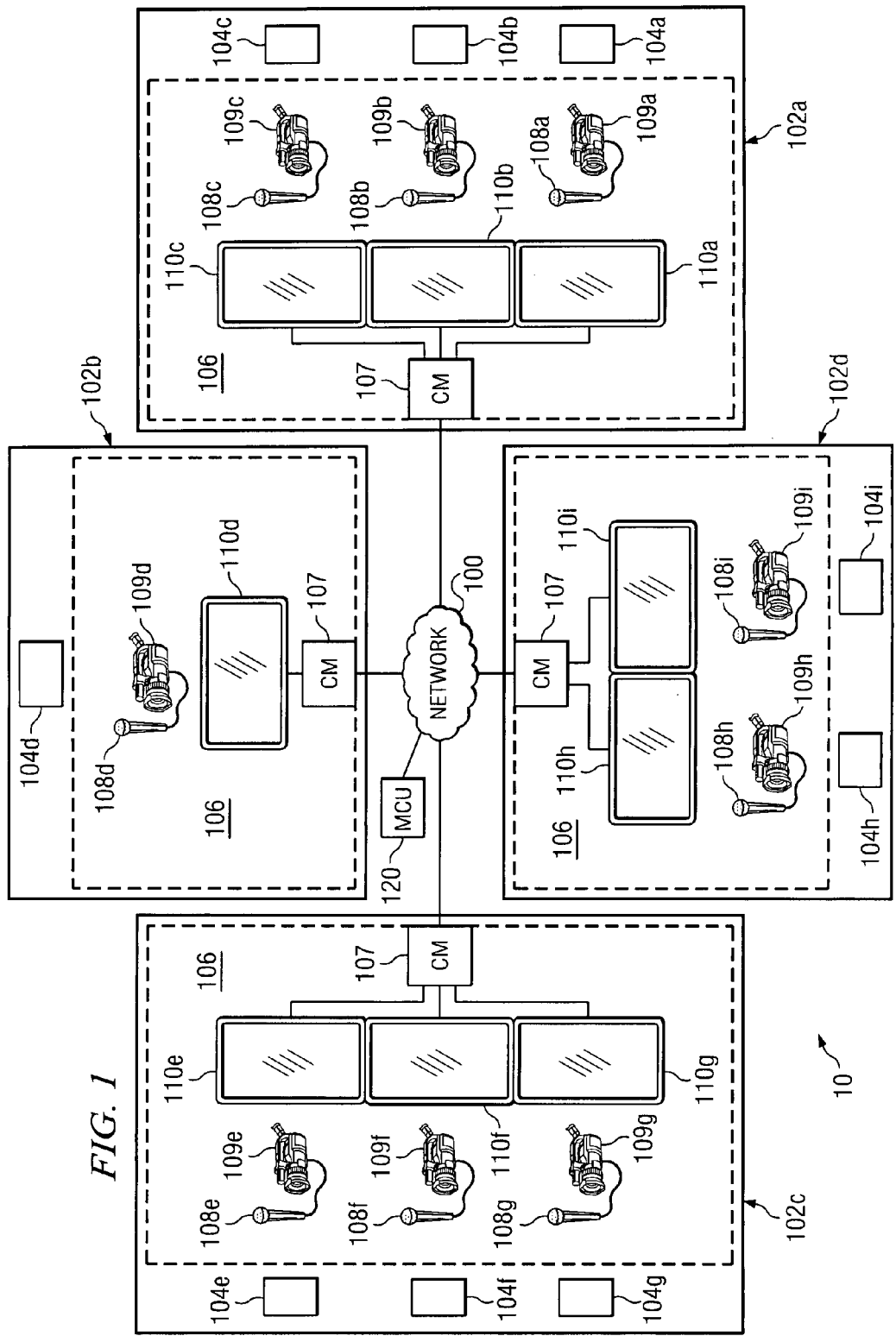
FIG. 1 is a block diagram illustrating a system for conducting a multipoint conference, in accordance with some embodiments.

FIG. 1 is a block diagram illustrating a communication system 10 for conducting a conference between a plurality of remote locations. The illustrated embodiment includes a communication network 100 that may support conferencing between remotely located sites 102 using conference equipment 106. Sites 102 may include any suitable number of users 104 that may participate in multiple videoconferences. Also illustrated is a multipoint control unit (MCU) 120 which facilitates the communication of audio and/or video signals between sites 102 while engaged in a conference. As used herein, a "conference" may include any communication session between a plurality of users transmitted using any audio and/or video means, including signals, data or messages transmitted through voice and/or video devices, text chat, and instant messaging.

Communication network 100 represents communication equipment, including hardware and any appropriate controlling logic for interconnecting elements coupled to communication network 100. In general, communication network 100 may be any network capable of transmitting audio and/or video telecommunication signals, data, and/or messages, including signals, data, or messages transmitted through text chat, instant messaging, and e-mail. Accordingly, communication network 100 may include all or a portion of, a radio access network; a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. To facilitate the described communication capabilities, communication network 100 may include routers, hubs, switches, gateways, call controllers, and or any other suitable components in any suitable form or arrangements. Additionally, communication network 102 may represent any hardware and/or software configured to communicate information in the form of packets, cells, frames, segments or other portions of data. Although communication network 100 is illustrated as a single network, communication network 100 may include any number or configuration of networks. Moreover, communication system 10 may include any number or configuration of communication networks 100.

User 104 represents one or more individuals or groups of individuals who may be present for the videoconference. Users 104 participate in the videoconference using any suitable device and/or component, such as audio Internet Protocol (IP) phones, video phone appliances, personal computer (PC) based video phones, and streaming clients. During the videoconference, users 104 may engage in the session as speakers or participate as non-speakers.

MCU 120 serves as an intermediary during a multipoint conference. In operation, MCU acts as a bridge which interconnects data signals from various conference sites. Specifically, MCU 120 may collect audio and/or video signals transmitted by conference participants through their endpoints and distribute such signals to other participants of the multipoint conference at remote sites 102. In operation, MCU may assign particular audio and/or video signals to particular monitors 110 or loudspeakers at a remote site 102. Additionally, MCU 120 may be configured to support any number of conference endpoints communicating on any number of conferences. MCU 120 may include, any bridging or switching device used in support of multipoint conferencing, including videoconferencing. In various embodiments, MCU 120 may include hardware, software and/or embedded logic such as, for example, one or more codecs. Further, MCU may be in the form of customer provided equipment (CPE, e.g. beyond the network interface) or may be embedded in a network such as communication network 102.

As illustrated in FIG. 1, sites 102 include conference equipment 106 which facilitates conferencing among users 104. Conference equipment 106 may include any suitable elements to establish and facilitate a videoconference. For example, conference equipment 106 may include loudspeakers, user interfaces, controllers, or a speakerphone. In the illustrated embodiment, conference equipment 106 includes conference manager 107, microphones 108, cameras 109, and monitors 110. While not shown, conference equipment 106 may include one or more network interfaces, memories, processors, codecs, or any other suitable hardware or software for videoconferencing between remote locations. According to a particular embodiment, conference equipment 106 may include any suitable dedicated conferencing devices. In operation, conference equipment 106 may establish a videoconference session using any suitable technology and/or protocol, such as Session Initiation Protocol (SIP) or H.323. Additionally, conference equipment 106 may support and be interoperable with other video systems supporting other standards, such as H.261, H.263, and/or H.264.

Conference managers ("CM") 107 may communicate information and signals to and from communication network 100 and a conference site 102. CM 107 may include any suitable hardware or software for managing a conference. Specifically, CM 107 may include one or more processors, memories, interfaces, or codecs. In operation, CM 107 may transmit and receive signals containing conference data to and from a site 102. In a particular embodiment, the transmitted signals may be audio-video (A/V) signals that carry video data in addition to audio data. The A/V signals may be an analog or a digital signal and may be compressed or uncompressed. In certain embodiments the A/V signals are signals including media (audio and video) packets transmitted using Real-time Transport Protocol (RTP). RTP is a standardized packet format for transmitting audio and video packets over the Internet. While each CM 107 is depicted as residing at a site 102, a CM 107 may be located anywhere within system 10.

Microphone 108 may be any acoustic to electric transducer or sensor operable to convert sound into an electrical signal. For the purposes of communication system 10, microphone 108 may capture the voice of a user at a local site 102 and transform it into an audio signal for transmission to a remote site 102. While in the illustrated embodiment, there is a microphone 108 for each user 104 a particular site 102 may have more or less microphones than users 104. Additionally, in certain embodiments microphones 108 may be combined with any other component of conference equipment 106 such as, for example, cameras 109.

As illustrated in FIG. 1, microphone 108 and/or CM 107 may be operable to encode audio signals, with an audiometric. For purposes of this specification, an audiometric is a confidence value or acoustic measurement which may be used to determine an active signal. An active signal is a signal which corresponds to a conference participant currently speaking (i.e. the active speaker). An audiometric may be measured and/or calculated based on the relative loudness (i.e. decibel level) of a particular voice. The audiometric may also be defined based on acoustic data collected by multiple microphones 108 at a particular site 10. For example, the audiometric for a particular audio signal may be weighted based on the decibel profile at a conference site. To illustrate, if user 104a is currently speaking, microphones 108a-108c may all pick up sound waves associated with the voice of user 104a. Because user 104a is closest to microphone 108a, the decibel level will be highest at microphone 108a, lower at microphone 108b, and lowest at microphone 108c. If each microphone 108a-108c were to individually assign an audiometric to the audio signal each produces, then there may be uncertainty as to whether the low decibel level at microphone 108c is due to user 104c speaking with a soft voice or whether microphone 108c is picking up residual sound waves from another speaker. However, given the decibel profile (i.e. the measured decibel levels at each of the microphones) for the conference site, there may be increased confidence that user 104a is an active speaker and, perhaps, the only active speaker. Accordingly, when defining the respective audiometrics for the audio signals generated by microphones 108a-108c, the audiometrics encoded for the signal generated by microphone 108c may be weighted to account for the decibel profile at the site. It should be noted that the audiometrics for a particular signal are dynamic. Accordingly, once user 104a stops speaking or another user 104 begins to speak, the audiometrics encoded in the respective audio packets for each signal may be adjusted accordingly.

Cameras 109 may include any suitable hardware and/or software to facilitate capturing an image of user 104 and the surrounding area. In certain embodiments, cameras 109 may capture and transmit the image of user 104 as a video signal. Depending on the embodiment, the transmitted video signal may include a separate signal (e.g., each camera 109 transmits its own signal) or a combined signal (e.g., the signal from multiple sources are combined into one video signal).

Monitors 110 may include any suitable hardware and/or software to facilitate receiving a video signal and displaying the image of a remote user 104 to users 104 at a local conference site. For example, monitors 110 may include a notebook PC, a wall mounted monitor, a floor mounted monitor, or a free standing monitor. Monitors 110 may display the image of user 104 using any suitable technology that provides a realistic image, such as high definition, high-power compression hardware, and efficient encoding/decoding standards.

In an example embodiment of operation of the components of communication system 10, users 104 at sites 102a and 102d participate in a conference. When users 104 join the conference, a video signal is generated for each camera 109 and is assigned to a monitor 110. This assignment may persist for the duration of the conference. Thus, a remote user may always be displayed on the same local monitor. This may make it easier for local users to identify who and where the remote user is positioned. To illustrate, camera 109a may be assigned to right monitor 110i, middle camera 109b may be assigned to left monitor 110h and top camera 109c may be assigned to left monitor 110h. Because left monitor 110h has both middle camera 109b and top camera 109c assigned to it, the monitor may switch between cameras 109b and 108c based on which user last spoke, or which user is currently speaking the loudest. Thus, as various users 104 speak during the conference, the video signal displayed on each monitor 110 may change to display the image of the last speaker.

Modifications, additions, or omissions may be made to system 10. For example, system 10 may include any suitable number of sites 102 and may facilitate a videoconference between any suitable number of sites 102. As another example, sites 102 may include any suitable number of microphones 108, cameras 109, and displays 110 to facilitate a videoconference. As yet another example, the videoconference between sites 102 may be point-to-point conferences or multipoint conferences. For point-to-point conferences, the number of displays 110 at local site 102 is less than the number of cameras 109 at remote site 102. For multipoint conferences, the aggregate number of cameras 109 at remote sites 102 is greater than the number of displays 110 at local site 102. Moreover, the operations of system 10 may be performed by more, fewer, or other components. Additionally, operations of system 10 may be performed using any suitable logic.

Figure 2:
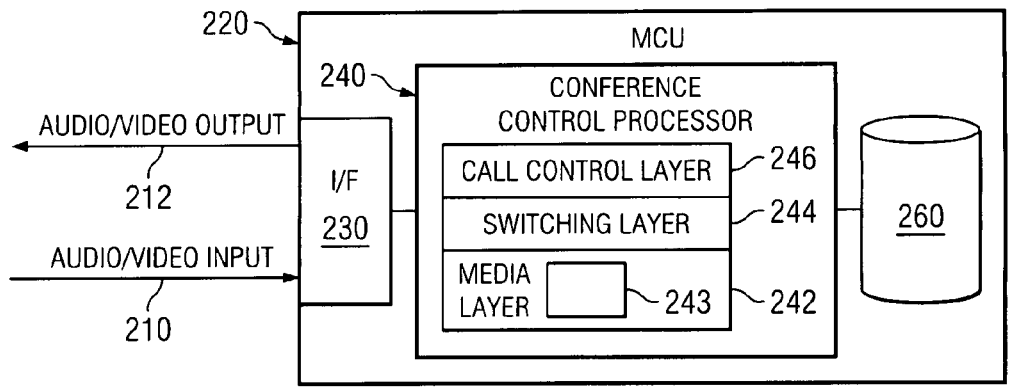
FIG. 2 is a simplified block diagram illustrating a multipoint control unit, in accordance with some embodiments.

FIG. 2 illustrates the components and operation of a MCU 220 in accordance with a particular embodiment. As represented in FIG. 2, MCU 220 includes interface 230, conference control processor (CCP) 240, and memory 260. MCU 220 may be similar to MCU 120 illustrated in FIG. 1. Also illustrated in FIG. 2 are A/V input signals 210 and A/V output signals 212.

Interface 230 is capable of communicating information and signals to and receiving information and signals from a communication network such as communication network 100 of FIG. 1. As illustrated, interface 230 is operable to receive one or more A/V input signals 210 from one or more sites participating in a conference and transmit one or more A/V output signals 212 to one or more other sites participating in the conference. It should be noted that A/V input signals 210 may be substantially similar to A/V output signals 212. Interface 230 represents any port or connection, real or virtual, including any suitable hardware and/or software that allow MCU 230 to exchange information and signals with other devices in a communication system. Accordingly, interface 230 may be or include an Ethernet driver, universal serial bus (USB) drive, network card and/or firewall.

Memory 260 may store CCP instructions and/or any other information used by MCU 220. Memory 260 may include any collection and arrangement of volatile or non-volatile, local or remote devices suitable for storing data. Examples of memory 260 include, but are not limited to random access memory (RAM) devices, dynamic random access memory (DRAM), read only memory (ROM) devices, magnetic storage devices, optical storage devices, flash memory, or any other suitable data storage devices.

CCP 240 controls the operation of MCU 220. In particular, CCP 240 processes information and signals received from cameras or other conference equipment at sites participating in a conference. CCP 240 may include any suitable hardware, software, or both that operate to control and process signals. Additionally, CCP 240 may include multiple processing layers arranged in a protocol stack which perform various tasks associated with the processing of media signals. For example, as illustrated, CCP 240 includes media layer 242, switching layer 244, and call control layer 246. As will be described in greater detail, each of the layers may be operable to perform one or more signal processing functions. While the illustrated protocol stack includes three layers, CCP 240 may include any number of processing layers. Further, each of the processing layers may include a separate processor, memory, hardware, or software for carrying out the recited functionality. Examples of CCP 240 include, but are not limited to, application-specific integrated circuits (ASICs), field-programmable gate arrays (FGPAs), digital signal processors (DSPs), and any other suitable specific or general purpose processors.

Media layer 242 may be a low level processing layer that receives one or more A/V signals and extracts any relevant information for higher level processing. More specifically, media layer 242 may detect A/V signals from one or more sites participating in a particular conference and extract audiometrics from audio packets in a media signal. As previously noted, an audiometric may be a confidence value which may be used to determine an active speaker. In the embodiment of CCP 240 represented in FIG. 2, media layer 242 interfaces with switching layer 244. Accordingly, media layer 242 may forward the extracted audiometric to switching layer 244 for further processing.

As illustrated in FIG. 2, media layer 242 maintains media forwarding table 243. Media forwarding table 243 may be a directory, listing, or other index for routing A/V signals to conference sites. For example, with respect to FIG. 1, media forwarding table 243 may indicate that A/V signals from site 102c should be directed to sites 102a and 102b. Media forwarding table 243 may further indicate that an A/V signal associated with a particular user 104 should be directed to a particular monitor 110 and/or loudspeaker at sites 102a and 102b. In certain embodiments, the media forwarding table may maintain separate routing listings for audio signals and their associated video signals. This may allow for a user at a local site to hear the voice of a speaker at a remote site without the image of the speaker appearing on one or more local monitors. Additionally, media forwarding table 243 may be dynamic. Thus, it may be modified or updated in response to a change in the active speaker(s) and/or according to any suitable user preferences. Thus, for example, when a conference participant, such as user 104g at site 102c, begins to speak, media forwarding table 243 may be updated so that the audio and video signals associated with user 1049 are broadcasted on monitor 110d at site 102b. Although FIG. 2 illustrates media forwarding table 243 as a component of media layer 242, media forwarding table may be stored or reside anywhere within MCU 220 or be accessible to MCU 220 via communications with other components in a communication system, such as communication system 10 of FIG. 1.

As represented in FIG. 2, switching layer 244 is a higher level processing layer operable to analyze audiometric data forwarded by processing layer 242. In particular, switching layer 244 may determine an active speaker based on audiometrics from various audio signals associated with a particular conference. Based on the active speaker, switching layer 244 may determine which of a plurality of signals to broadcast at various sites participating in a conference. For purposes of this specification, audio and video signal(s) selected for broadcasting may be referred to as the active audio and active video signals, respectively. Upon determining the active audio and/or active video signals, switching layer 244 may update media forwarding table 243. This may be performed by communicating a status message containing relevant information to media layer 242. Such information may include an update, change or status confirmation regarding the active audio and active video signals. Responsive to the status message, media layer 242 may modify media forwarding table 243 so that the audio and video signals associated with the active speaker are properly routed.

Call control layer 246, as illustrated in FIG. 2, is a processing layer for managing communications to and from conference sites. In particular, call control layer may decode address information and route communications from one conference site to another. Thus, when a site dials into or otherwise connects to a conference, call control layer 246 may connect the site to one or more remote sites for a conference.

In an embodiment, MCU 220 may receive A/V input signals 210 from multiple conference sites at interface 230. As mentioned, A/V input signals 210 may be a stream of media packets which include audio and video data generated at a local site for broadcast at a remote site. The audio data may include an audiometric which may be extracted from the audio packets to provide a confidence metric which may be used to determine an active speaker. Upon receiving A/V input signals 210, interface 230 may forward the signals to CCP 240 for processing. Media layer 242 may then detect whether the A/V signals are associated with a particular conference. Following detection, media layer 242 may extract the audiometric(s) from audio packets in the audio signals. After extracting the audiometrics, media layer 242 may forward the audiometric to the switching layer 244. The switching layer 244 may then determine an active signal(s) based on one or more audiometrics and update or modify media forwarding table 243 so that the active signal(s) may be broadcasted at remote conference sites. In response to the update, media layer 242 may forward audio and/or video packets associated with A/V input signal 210 so that they are distributed to the conference sites in accordance with the media forwarding table. The packets may then be distributed (as A/V output signal 212) through interface 230.

In accordance with a particular embodiment of MCU 220, the signal processing and forwarding functionality described with respect to CCP 240 may be implemented through interface 230. In particular, interface 230 may maintain a Linux kernel utilizing Netfilter software. Netfilter is an open-source packet filtering framework which operates within a Linux kernel. Using Netfilter hooks, interface 230 may detect and intercept A/V packets associated with a particular conference before they enter the processing layers of CCP 240. The Linux kernel may then extract the audiometrics encoded in the audio packets and, similar to medial layer 242, present the audiometrics to switching layer 244. Switching layer 244 may, as previously described, make corresponding switching decisions. The Linux kernel may also maintain a media forwarding table, similar to media forwarding table 243, for routing the active audio and active video signals to conference sites. In a particular embodiment wherein RTP is used to transport audio and video data, the Linux kernel may separate RTP data packets and RTP control protocol (RTCP) packets. RTCP packets partner with RTP in sending and receiving multimedia data, however they do not transport any data itself. The Linux kernel may forward the RTCP packets to CCP 240 for processing by an application. Because A/V packets are intercepted before reaching CCP 240, performing the signal processing and forwarding at interface 230 may reduce communication latency and jitter.

In certain embodiments, switching decisions may be implemented in a manner which conserves media processing by MCU 220. To limit traffic, media data transmitted from an inactive conference site to MCU 220 may be compressed or limited to an audio signal. Alternatively, media processor 242 may recognize that certain media packets are associated with an inactive site and decline to process the information. Accordingly, in particular embodiments, when a signal is newly designated as active, media layer 242 and/or interface 230 may send a request to a codec at the conference site associated with the signal to send an instantaneous decoder refresh (IDR) frame. The IDR frame may contain information necessary for a codec at the MCU to initiate processing and displaying of the audio and/or video signals from the site. Upon receiving the frame, MCU 220 may initiate processing of the signal and thereby transmit the signal in accordance with media forwarding table 243. Thus, during the period from when a signal is designated as active to the time that an IDR frame is received, the old (i.e. previously active signal) may be transmitted by MCU 220. While this may increase the switching time, MCU resources may be conserved as less media processing may be necessary.

The selection of an active signal (i.e. determining an active speaker), may be performed in a similar manner whether signal processing is performed by interface 230 or by CCP 240. The active speaker may be determined based on the audiometrics associated with the packets of various audio signals. As discussed with respect to FIG. 1, each microphone 107 may generate an audio signal consisting of packets of audio data coded with an audiometric. Switching layer 244 and/or interface 230 may determine the active speaker by comparing the audiometrics associated with the packets of each signal. In an embodiment, the packets in each of the respective signals from which an audiometric is extracted have approximately the same timestamps. This may ensure that the audiometrics used to select an active signal are from packets generated at approximately same time. From comparing the audiometrics associated with each signal, an active audio signal corresponding to an active speaker may be selected. For example, the audio signal including the packet(s) with the highest audiometric(s) may be selected as the signal corresponding to the active speaker. In a particular embodiment, switching layer 244 and/or interface 230 may rank the signals according to their audiometrics. Thus, if a conference site has multiple monitors and/or loudspeakers, the signals associated with the most likely active speakers may be broadcasted.

As may be evident, the active speaker may change any number of times during the course of a conference. Therefore, switching layer 244 and/or interface 230 may constantly monitor the audiometrics of signals associated with a conference. Because an audio signal may consist of numerous packets, each of which may be coded with an audiometric, the determination of an active speaker may be performed on a packet-by-packet basis. However, switching/updating active video and active audio signals according to data in a particular group of packets from multiple audio signals may not provide the best user experience. This is because certain occurrences such as a sneeze, cough, or phone ring may produce packets which encoded with audiometrics which may be indicative of an active speaker. Thus, the sensitivity of a packet-by-packet active speaker determination may cause for a conference participant to be wrongly designated as an active speaker which may lead to audio and video signals associated with that participant to be improperly designated as the active audio and active video signals. Because the active audio and/or active video designation may only be momentary, events such as a sneeze may cause flickering of monitors or loudspeakers speakers at remote conference sites.

To address potential problems with flickering, according to a particular embodiment, an active speaker may be determined based on audio packets generated over 200 millisecond intervals or another specified or programmed time interval. The 200 milliseconds serves as a damping period to ensure that a particular signal is not designated active as a result of a sudden rise in the audiometric(s) associated with the signal. Thus, a conference participant may be designated as an active speaker if the audiometrics from the audio signal associated with the participant indicate that the participant has remained active for 200 milliseconds. Similarly, switching layer 244 and/or interface 230 may employ any suitable algorithm for determining an active speaker over a given damping period. As an example, the signal(s) having the highest average audiometric values over a 200 millisecond interval may be selected as the active signal (s). This may account for pauses or other breaks in speech that produce audio packets encoded with low audiometrics. While the foregoing operation(s) of switching layer 244 and/or interface 230 have been described using a 200 millisecond damping period, a damping period of any length may be implemented.

In an embodiment, audio and video signals may be separately designated as active. Specifically, different damping intervals for audio and video signals may be employed. For example, as discussed, the audio signal generated by a microphone associated with a conference participant may be designated as active while the corresponding video signal generated by a camera associated with the participant is inactive. Continuing with the 200 millisecond damping interval, an audio signal may be designated as active every 200 milliseconds. By contrast, the associated video signal may be designated as active every 2 seconds. Therefore, a participant at a site may hear the voice of a remote participant prior to the image of the participant appearing on a local monitor. Employing different damping intervals for audio and video signals may enhance user experience by limiting flickering on monitors while simultaneously allowing conference participants to hear a speaker at a remote site. Additionally, maintaining a shorter damping period for audio signals, as compared to video signals, may prevent local participants from missing communications from remote conference participants.

Because a video signal may be designated as active separately from the associated audio signal, switching layer 244 and/or interface 230 may employ different protocols for determining an active video signal as opposed to an active audio signal. For instance, switching layer 244 may, in conjunction with memory 260, maintain an archive of the active audio signals. The archive may thereby be used to select the active video signal. To illustrate, the archive might record each occasion a change in the active audio signal occurs. Alternatively, the archive may record the active audio signal after each audio damping period. Thus, if the audio damping period is 200 milliseconds and the damping period for video signals is 2 seconds, then the active video may be based on the previous ten archive entries. In an embodiment, if the archive indicates that a particular audio signal has been active for the entire video damping period then the video signal associated with that audio signal may be selected as the active video signal. In another embodiment, the video signal designated as active may be the one which is associated with the audio signal that was active for a majority the video damping period. It should be noted that, as with audio signals, more than a single video signal may be designated as active. Additionally, while specific methods for selecting an active video signal have been described, various other methods for selecting an active video signal based on an active audio signal(s) may be implemented.

Figure 3:
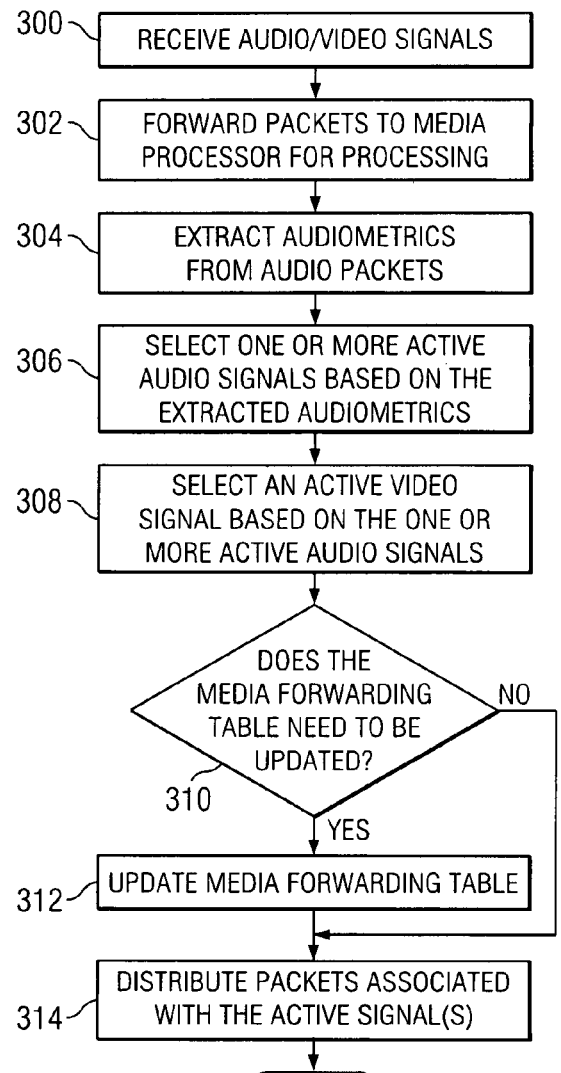
FIG. 3 is a flowchart illustrating a method for distributing media packets in a multipoint conference, in accordance with some embodiments.

Referring now to FIG. 3, a flow chart illustrating an example operation of MCU 220 in accordance with a particular embodiment is provided. The method begins at step 300 where a plurality of audio and video signals are received. The signals may be received by an interface, such as interface 230. The audio signals may consist of a plurality of packets transporting audio data generated by one or more microphones at remote sites for broadcasting at local conference sites. One or more of the packets in each of the audio signals may be coded with an audiometric which provides a confidence value for determining an active speaker.

Next, at step 302, the packets are forwarded to CCP 240 for processing. Audiometrics are then extracted from packets in each of the signals at step 304. The extraction step may be performed by media layer 242.

At step 306, an active audio signal may be selected. The selection may be made by switching layer 244 and may be based on a comparison of the extracted audiometrics. The comparison may include on audiometrics extracted from packets having a particular timestamp. Accordingly, the determination of an active audio signal may be based on the signal having the highest audiometric for the particular timestamp or having the highest audiometrics over a range of timestamps. Additionally, switching layer 244 may select multiple signals to be active or rank the signals based on their audiometrics. Switching layer may also select an active video signal at step 308 based on the selection of the active audio signal.

After an active signal(s) is selected, switching layer 244 may determine whether to update the media forwarding table 243 at step 310. This determination may be based on a change in the active audio signal(s) which requires re-routing of the audio and/or video signals among the sites participating in the conference. If the media forwarding table is to be updated, switching layer 244 may communicate the update to media layer 242 which may thereby modify the media forwarding table at step 312.

Whether or not the media forwarding table 243 is updated, media layer 242 may, at step 314, distribute the packets associated with the active audio and/or active video signals to one or more of the participating conference sites. The packets may be distributed based on the routing parameters in the media forwarding table 243. In certain embodiments, media layer 242 may, based on the media forwarding table, distribute/route packets to particular monitors and/or loudspeakers at a conference site.

Modifications, additions, or omissions may be made to the method depicted in FIG. 3. In certain embodiments, the method may include more, fewer, or other steps. For instance, media layer 242 may distribute packets in accordance with media forwarding table 243 as soon as the packets are received. When an update to the media forwarding table occurs, media layer 240 may proceed by routing the packets according to the updated table. Accordingly, steps may be performed in any suitable order without departing from the scope of the invention.

While the present invention has been described in detail with reference to particular embodiments, numerous changes, substitutions, variations, alterations and modifications may be ascertained by those skilled in the art, and it is intended that the present invention encompass all such changes, substitutions, variations, alterations and modifications as falling within the spirit and scope of the appended claims.

What is claimed is:

1. A method for distributing media packets in a multipoint conference, comprising:
    receiving a plurality of audio signals, each of the plurality of audio signals including audio packets, wherein one or more audio packets from each of the plurality of audio signals is coded with an audiometric, the audiometric including an acoustic measurement from a conference site;
    extracting one or more audiometrics from one or more audio packets for each of the plurality of audio signals;
    selecting one or more active audio signals based on the one or more extracted audiometrics;
    determining a change in the active audio signal;
    updating a media forwarding table in response to determining a change in an active audio signal, the media forwarding table including a directory for routing one or more of the plurality of audio signals;
    receiving, in response to determining a change in the active audio signal, an instantaneous decoder refresh frame prior to distributing audio packets to one or more conference sites in accordance with the media forwarding table; and
    distributing audio packets to one or more conference sites in accordance with the media forwarding table.

2. The method of claim 1, further comprising:
    receiving a plurality of video signals, each of the plurality of video signals associated with one or more of the plurality of audio signals;
    selecting an active video signal based on the one or more active audio signals; and
    distributing one or more of the video signals in accordance with the media forwarding table, wherein the media forwarding table includes a directory for routing one or more of the plurality of video signals.

3. The method of claim 2, further comprising:
    determining a change in the active video signal; and
    updating the media forwarding table in response to determining a change in the active video signal.

4. The method of claim 2, wherein selecting an active video signal based on one or more active audio signals includes selecting an active video signal based on an archive, the archive maintaining a record of one or more active audio signals.

5. The method of claim 2, further comprising displaying the active video signal at a conference site.

6. The method of claim 1, wherein selecting one or more active audio signals based on the one or more extracted audiometrics includes comparing a plurality audiometrics from each of the plurality of audio signals, wherein the plurality of audiometrics are extracted from audio packets generated over a given time interval.

7. The method of claim 1, further comprising:
    broadcasting the one or more active audio signals at a remote conference site.

8. The method of claim 1, wherein the audiometric includes a decibel measurement at a conference site.

9. The method of claim 1, wherein the audiometric is weighted based on a plurality of acoustic measurements at a conference site.

10. The method of claim 1, further comprising:
    ranking the plurality of audio signals according to the extracted audiometrics.

11. A multipoint control unit for distributing media packets in a multipoint conference comprising:
    an interface operable to receive a plurality of audio signals, each of the plurality of audio signals including audio packets, wherein one or more audio packets from each of the plurality of audio signals is coded with an audiometric, the audiometric including an acoustic measurement from a conference site; and
    a conference control processor operable to:
        extract one or more audiometrics from one or more audio packets for each of the plurality of audio signals;
        select one or more active audio signals based on the one or more extracted audiometrics;
        determine a change in the active audio signal;
        update a media forwarding table in response to determining a change in an active audio signal, the media forwarding table including a directory for routing one or more of the plurality of audio signals;
        receive, in response to determining a change in the active audio signal, an instantaneous decoder refresh frame prior to distributing audio packets to one or more conference sites in accordance with the media forwarding table; and
        distribute audio packets to one or more conference sites in accordance with the media forwarding table.

12. The multipoint control unit of claim 11, wherein the conference control processor is operable to:
    select an active video signal based on the one or more active audio signals; and
    distribute one or more of the video signals in accordance with the media forwarding table, wherein the media forwarding table includes a directory for routing one or more of the plurality of video signals.

13. The multipoint control unit of claim 12, wherein the conference control processor is operable to:
    determine a change in the active video signal; and
    update the media forwarding table in response to determining a change in the active video signal.

14. The multipoint control unit of claim 12, wherein the conference control processor is operable to select an active video signal based on one or more active audio signals by selecting an active video signal based on an archive, the archive maintaining a record of one or more active audio signals.

15. The multipoint control unit of claim 11, wherein the conference control processor includes:
    a media layer operable to:
        extract one or more audiometrics from one or more audio packets;

forward the one or more extracted audiometrics to a switching layer; and
distribute one or more of the video signals in accordance with the media forwarding table; and
a switching layer operable to:
select one or more active audio signals based on the one or more extracted audiometrics;
determine a change in the active audio signal;
update the media forwarding table in response to determining a change in an active audio signal.

16. The multipoint control unit of claim 11, wherein the conference control processor is operable to select one or more active audio signals based on the extracted audiometrics by comparing a plurality audiometrics from each of the plurality of audio signals, wherein the plurality of audiometrics are extracted from audio packets generated over a given time interval.

17. The multipoint control unit of claim 11, wherein the audiometric includes a decibel measurement at a conference site.

18. The multipoint control unit of claim 11, wherein the audiometric is weighted based on a plurality of acoustic measurements at a conference site.

19. The multipoint control unit of claim 11, wherein the conference control processor is further operable to rank the plurality of audio signals according to the extracted audiometrics.

20. A non-transitory, computer readable medium including code for distributing media packets in a multipoint conference, the code operable, when executed on a processor, to:
receive a plurality of audio signals, each of the plurality of audio signals including audio packets, wherein one or more audio packets from each of the plurality of audio signals is coded with an audiometric, the audiometric including an acoustic measurement from a conference site;
extract one or more audiometrics from one or more audio packets for each of the plurality of audio signals;
select one or more active audio signals based on the one or more extracted audiometrics;
determine a change in the active audio signal;
update a media forwarding table in response to determining a change in an active audio signal, the media forwarding table including a directory for routing one or more of the plurality of audio signals;
receive, in response to determining a change in the active audio signal, an instantaneous decoder refresh frame prior to distributing audio packets to one or more conference sites in accordance with the media forwarding table; and
distribute audio packets to one or more conference sites in accordance with the media forwarding table.

21. The computer readable medium of claim 20, wherein the code is operable to:
receive a plurality of video signals, each of the plurality of video signals associated with one or more of the plurality of audio signals;
select an active video signal based on the one or more active audio signals; and
distribute one or more of the video signals in accordance with the media forwarding table, wherein the media forwarding table includes a directory for routing one or more of the plurality of video signals.

22. The computer readable medium of claim 21, wherein the code is operable to:
determine a change in the active video signal; and
update the media forwarding table in response to determining a change in the active video signal.

23. The computer readable medium of claim 21, wherein the code is operable to select an active video signal based on one or more active audio signals by selecting an active video signal based on an archive, the archive maintaining a record of one or more active audio signals.

24. The computer readable medium of claim 21, wherein the code is operable to display the active video signal at a conference site.

25. The computer readable medium of claim 20, wherein the code is operable to select one or more active audio signals based on the one or more extracted audiometrics by comparing a plurality audiometrics from each of the plurality of audio signals, wherein the plurality of audiometrics are extracted from audio packets generated over a given time interval.

26. The computer readable medium of claim 20, wherein the code is operable to broadcast the one or more active audio signals at a remote conference site.

27. The computer readable medium of claim 20, wherein the audiometric includes a decibel measurement at a conference site.

28. The computer readable medium of claim 20, wherein the audiometric is weighted based on a plurality of acoustic measurements at a conference site.

29. The computer readable medium of claim 20, wherein the code is operable to rank the plurality of audio signals according to the extracted audiometrics.

30. A multipoint control unit for distributing media packets in a multipoint conference, comprising:
means for receiving a plurality of audio signals, each of the plurality of audio signals including audio packets, wherein one or more audio packets from each of the plurality of audio signals is coded with an audiometric, the audiometric including an acoustic measurement from a conference site;
means for extracting one or more audiometrics from one or more audio packets for each of the plurality of audio signals;
means for selecting one or more active audio signals based on the one or more extracted audiometrics;
means for determining a change in the active audio signal;
means for updating a media forwarding table in response to determining a change in an active audio signal, the media forwarding table including a directory for routing one or more of the plurality of audio signals;
means for receiving, in response to determining a change in the active audio signal, an instantaneous decoder refresh frame prior to distributing audio packets to one or more conference sites in accordance with the media forwarding table; and
means for distributing audio packets to one or more conference sites in accordance with the media forwarding table.

* * * * *